(12) United States Patent
Sajadieh et al.

(10) Patent No.: US 8,989,207 B2
(45) Date of Patent: Mar. 24, 2015

(54) SYSTEM AND METHOD FOR RESOURCE ALLOCATION PRIORITY IN MULTIPLE-PERSONA CELLULAR DEVICES

(71) Applicants: Masoud Sajadieh, Fremont, CA (US); Andreas Schmidt, Braunschweig (DE)

(72) Inventors: Masoud Sajadieh, Fremont, CA (US); Andreas Schmidt, Braunschweig (DE)

(73) Assignee: Intel Corporation, Santa Clara, CA (US)

(*) Notice: Subject to any disclaimer, the term of this patent is extended or adjusted under 35 U.S.C. 154(b) by 110 days.

(21) Appl. No.: 13/629,550

(22) Filed: Sep. 27, 2012

(65) Prior Publication Data

US 2014/0086159 A1 Mar. 27, 2014

(51) Int. Cl.
*H04B 7/212* (2006.01)
*H04W 72/12* (2009.01)
*H04W 72/10* (2009.01)

(52) U.S. Cl.
CPC .............. *H04W 72/12* (2013.01); *H04W 72/10* (2013.01)
USPC ........................................................ 370/444

(58) Field of Classification Search
USPC ............ 370/329, 341, 395.2, 395.21, 395.42, 370/395.43, 443, 444, 431; 455/450, 464, 455/509, 435.1, 435.2, 435.3, 512
See application file for complete search history.

(56) References Cited

U.S. PATENT DOCUMENTS

| 6,751,472 | B1 | 6/2004 | Muhonen |
| 2006/0094429 | A1 | 5/2006 | Ramalho et al. |
| 2009/0024728 | A1 | 1/2009 | Russell |
| 2009/0086705 | A1* | 4/2009 | Zisimopoulos et al. ...... 370/347 |
| 2010/0103869 | A1 | 4/2010 | Naden |
| 2012/0140743 | A1* | 6/2012 | Pelletier et al. ............... 370/335 |

FOREIGN PATENT DOCUMENTS

WO  WO-2004102927 A2  11/2004

OTHER PUBLICATIONS

"International Application Serial No. PCT/US2013/044751, International Search Report mailed Oct. 7, 2013", 4 pgs.
"International Application Serial No. PCT/US2013/044751, Written Opinion mailed Oct. 7, 2013", 6 pgs.

* cited by examiner

*Primary Examiner* — Edan Orgad
*Assistant Examiner* — Saumit Shah
(74) *Attorney, Agent, or Firm* — Schwegman Lundberg & Woessner, P.A.; Theresa R. Stadheim (57) ABSTRACT

A multiple-persona system and method is described, wherein a UE (user equipment) is able to connect to two different networks simultaneously. In a multiple-persona system, one of the personas may have a higher significance than the other persona. For example, a connection to a work network may be prioritized over connection to a home network. In such a situation, it may be desirable to have applications running on the work network have priority over applications running on the home network. Such a method and system may operate independently of the eNodeB or have the eNodeB actively controlling the priority among the personas. The scheduler in either the eNodeB or the UE may contain anew input for the significance of the persona. The significance of the persona is taken into account when sending data to and from the UE.

10 Claims, 6 Drawing Sheets

| QCI | RESOURCE TYPE | PRIORITY | PACKET DELAY BUDGET (MS) | PACKET ERROR LOSS RATE | EXAMPLE SERVICES |
|---|---|---|---|---|---|
| 1 | GBR | 2 | 100 | $10^{-2}$ | CONVERSATIONAL VOICE |
| 2 | GBR | 4 | 150 | $10^{-3}$ | CONVERSATIONAL VIDEO (LIVE STREAMING) |
| 3 | GBR | 5 | 300 | $10^{-6}$ | NON-CONVERSATIONAL VIDEO (BUFFERED STREAMING) |
| 4 | GBR | 3 | 50 | $10^{-3}$ | REAL-TIME GAMING |
| 5 | NON-GBR | 1 | 100 | $10^{-6}$ | IMS SIGNALING |
| 6 | NON-GBR | 7 | 100 | $10^{-3}$ | VOICE, VIDEO (LIVE STREAMING), INTERACTIVE GAMING |
| 7 | NON-GBR | 6 | 300 | $10^{-6}$ | VIDEO (BUFFERED STREAMING) |
| 8 | NON-GBR | 8 | 300 | $10^{-6}$ | TCP-BASED (FOR EXAMPLE, WWW, E-MAIL), CHAT, FTR, P2P FILE SHARING, PROGRESSIVE VIDEO AND OTHERS |
| 9 | NON-GBR | 9 | 300 | $10^{-6}$ | |

FIG. 1

CONVENTIONAL ART

SYSTEM AND METHOD FOR RESOURCE ALLOCATION PRIORITY IN MULTIPLE-PERSONA CELLULAR DEVICES

TECHNICAL FIELD

Embodiments pertain to consumer electronics devices, and more particularly, to mobile devices that use cellular technology, including smartphones and tablets.

BACKGROUND ART

A cellular mobile device (or User Equipment (UE)), including but not limited to, a tablet, a smart phone, a laptop, or a modem, sometimes are involved in multiple-use scenarios. An example of such a multiple-use scenario is a Corporate/Home dual-persona mode, where a UE is coupled to one network to access corporate data and to another to access personal data. The LIE may need to connect simultaneously to multiple networks, depending on the applications being used by the device. In a similar manner, a multiple-use scenario may occur when accessing data while making a phone call. It would be desirable to facilitate such connections.

BRIEF DESCRIPTION OF THE DRAWINGS

The subject matter regarded as the invention is particularly pointed and distinctly claimed in the concluding portion of the specification. Time invention, however, both as to organization and method of operation, together with objects, features, and advantages, may best be understood by reference to the following detailed description when read with the accompanying drawings, in which:

DESCRIPTION OF THE EMBODIMENTS

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement".

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. Each subcarrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

Consequently, in a 3GPP-LTE transmitter, user data is error encoded, mapped into a symbol constellation, reference pilot signals added, and a serial-to-parallel conversion applied to group the multiplexed symbols/reference pilots into sets of tones (in the frequency domain). An N-point inverse fast Fourier transform (IFFT) is applied to each set, where the integer size, N, of the N-point IFFT depends on the number of OFDM channels. The output of the IFFT is a set of complex time-domain samples. A parallel-to-serial conversion is applied to this time-domain sample stream before conversion from the digital domain to analog domain by a digital-to-analog converter (DAC). The DAC is clocked at the FFTT sampling rate of the IFFT. The analog signal is then modulated and transmitted through the wireless medium.

In the 3GPP LTE framework of Quality-of-Service (QoS), the priority of different services and applications has been characterized in terms of QoS Class Iidentifier (QCI), QCI is a scalar (also called "label") that represents the QoS characteristics that the Evolved Packet Core (EPC) is expected to provide for a particular Service Data Flow (SDF). There are nine pre-defined QCI levels as part of the LTE QoS definition.

Based on the following metrics, a given application running on UE receives a certain priority or QCI:
1) Layer 2 packet delay budget;
2) Layer 2 packet error loss; and
3) Bearer Type (Guaranteed Bit Rate (GBR) vs. Non-GBR)

QCI determines the forwarding treatment of the application data packets throughout the LTE network nodes. For applications requiring a Guaranteed Bit Rate (GBR), another parameter called Allocation and Retention Priority (ARP) handles admission control by accepting or rejecting bearer establishment or modification of GBR services during a limitation on resource, such as congestion. ARP is also used to decide which bearers to drop during exceptional resource limitations (e.g., at handover). ARP ranges from 1 to 15 in decreasing level of priority. An ARP Pre-emption Capability flag of a given service determines if the current service can pre-empt other, less prioritized services. An ARP Pre-emption Vulnerability flag, on the other hand, indicates if resources can be relinquished in favor of other services.

Figure 1:
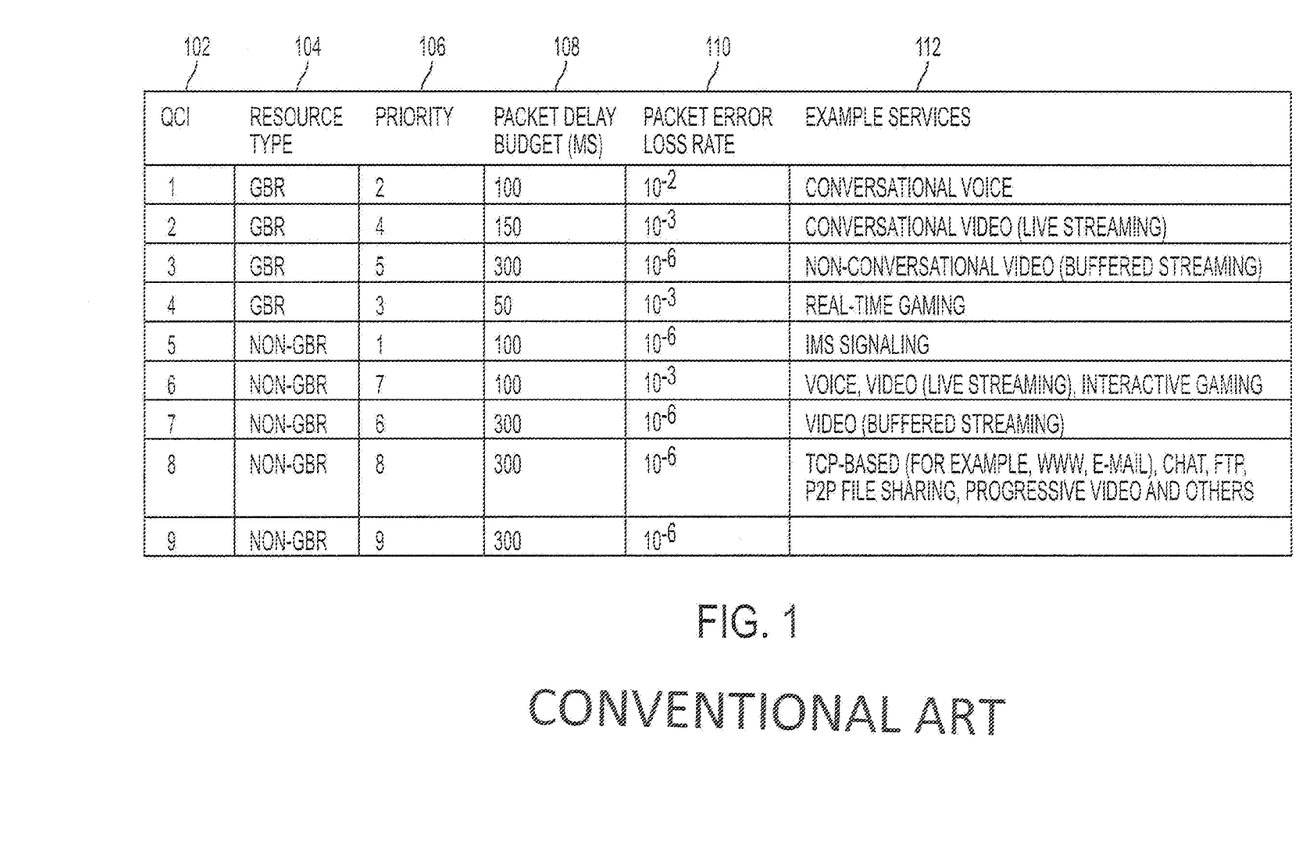
FIG. 1 is a table illustrating various Quality of Service Class Identifier (QCI) levels.

QCI levels are numbered 1 through 9. FIG. 1 is a table illustrating the various QCI levels. Column 102 is the defined QCI level. As described above, the QCI level is numbered from 1 to 9. Column 104 is the resource type (guaranteed bit rate or non-guaranteed bit rate). Column 106 is the priority level of the QCI level. It should be noted that the priority level is not the same as the QCI level. For example, the QCI level with the highest priority is QCI level 5. Column 108 is the maximum packet delay budget, in milliseconds, of the QCI level. Column 110 is the maximum acceptable packet error loss rate for the QCI level. Column 112 shows exemplary services that may use a particular QCI level. In some embodiments, the default bearer is QCI level 9.

Because QCI is set solely based on the intrinsic requirements of a single given application, it cannot handle the precedence of a persona—QCI was not designed with multiple-persona UEs in mind. This is because there is no one-to-one correspondence between a persona and an application. In a Multiple-Persona (MP) system, a persona, at any given time, may be executing applications independently of another persona.

For example, consider the case where two applications are involved; a buffered streaming session and an IP Multimedia Subsystem (IMS) signaling application with, respectively, priorities 5 and 1 as per the defined QCI characteristics. In a single-persona system running those two applications, the IMS signaling application receives a higher priority (because priority 1 is higher than priority 5).

In an MP device or VE, there may be two or more personas simultaneously operating on the UE. For example, persona 1 may be a corporate persona, where the LIE connects to his employer's network. Persona 2 may be a personal persona, where the UE connects to the user's home network. This may be desirable for any number of reasons. For example, an employer may wish to limit the bandwidth on its network. Getting users to obtain some information from their own home network may help to alleviate this problem. Or an employer may have specific applications that it only wants to run on its own network for privacy reasons. There may be many other reasons why one would desire to have multiple personas on a UE.

In the above situation, persona 1 may be assigned a higher "significance" than persona 2. Significance is a term that indicates a new form of priority that is specific to personas, more particularly, information as to which persona is to receive precedence over other personas.

In the case of an MP device, persona 1 (P1, with higher significance) may correspond to the buffered streaming session while persona 2 (P2, lower significance), is running the IMS signaling application. In this example, the LTE QoS priority (which favors the IMS signaling application) is not aligned with the persona significance (which favors the buffered streaming session). Therefore, a solution should be devised to honor the significance of persona P1 by giving applications running on P1 priority over applications running on P2. Of course, there may be limitations to always giving priority to applications running on P1, as described later in the application.

It should be understood that the underlying MP system is aware of the significance of each persona and requires the connectivity system to uphold and enforce the implied precedence of P1. Possible problems that may need to be solved include the potential conflict between the persona significance and the existing Quality-of-Service (QoS) framework (also referred to as 'radio priority') within an LTE cellular communication system. For GBR services i.e., QCI levels 1 through 4), the ARP should be aligned with the persona significance so that P1 receives priority in the network.

Current solutions to dual-persona mobile applications such as Corporate/Home are implemented on top of the radio layer and are QoS-unaware. Therefore, these solutions cannot take into account the added dimension of the persona significance and potential conflict that may arise between significance and radio priority. There should be a coherent framework addressing this issue to make optimal use of system resources. Brute three actions, such as declining the service by the user or disconnecting a P2 application when a P1 application is becoming active, are rudimentary and run counter to the rich set of QoS definitions in the LTE cellular communication system and result in inefficient use of both air interface and network resources.

A standard cellular system is distributed in the sense that for a specific task, different nodes of the cellular infrastructure may contribute functions to complete the task. Ideally, one would like to reduce the interaction of the nodes to minimize the signaling burden. In the case of an MP device, the accommodation of persona significance (and resolution of the potential conflict with radio priority) can be confined to the UE device or it can be achieved in concert with other network nodes.

eNodeB MP-Unaware Solution

In this embodiment, only the UE architecture is impacted. In other words, traffic priority occurs in the uplink direction (from the UE to the eNodeB) and the downlink prioritization in the eNodeB (from the eNodeB to the UE) remains unchanged. To the extent the question of the significance and priority are concerned, the uplink (UL) scheduler is the central element where the outcome should be influenced by the persona significance.

Figure 2:
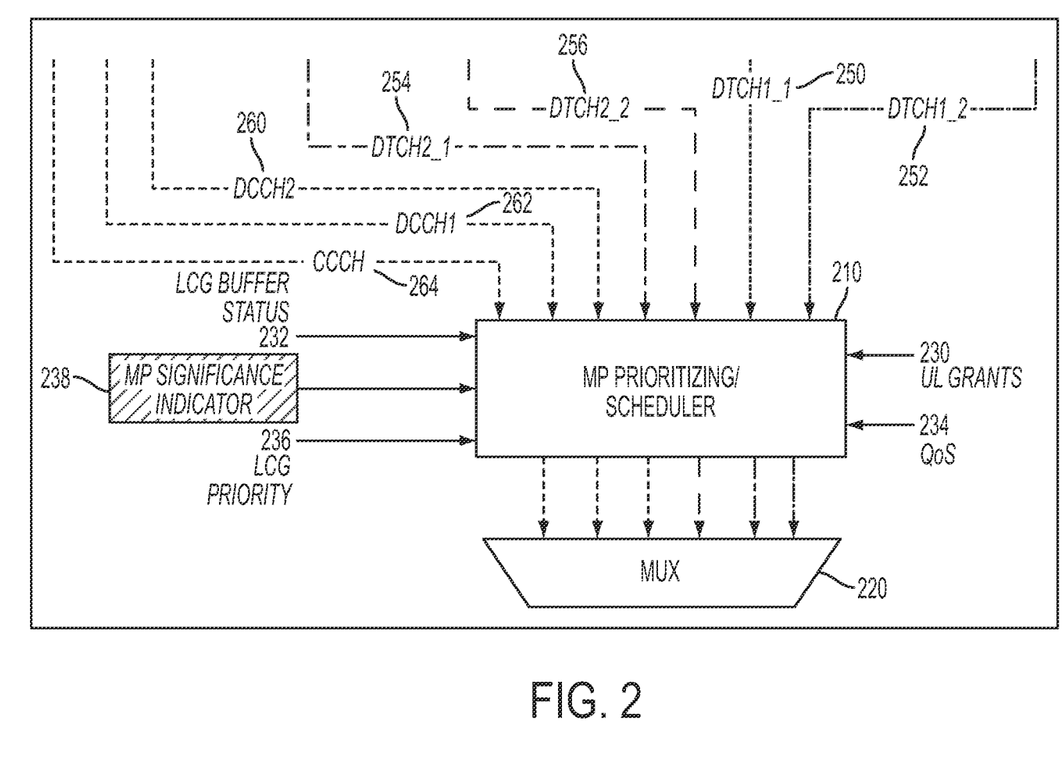
FIG. 2 is a diagram illustrating an overview of an embodiment of the present invention.

FIG. 2 illustrates a scenario where four data bearers 250, 252, 254, 256 (downlink traffic channels 1_1, 1_2, 2_1, and 2_2) from two personas, in addition to three signaling bearers 260, 262, 264 (2 dedicated control channel (DCCH) and common control channel (CCCH)) are incident on the UE scheduler 210 in the uplink direction. In a traditional uplink scheduler, the inputs to the scheduler are UL grants received from the eNodeB 230, the buffer status per LCG 232, QoS requirements of the traffic bearers 234, and Logical Channel Group (LCG) priority 236. Scheduler 210 uses those inputs to determine the priority of data bearers 250-256 and signal bearers 260-264. Multiplexer ("mux") 220 aggregates all the transport channels into a single physical channel.

In one embodiment of this invention, persona significance information 238 is directly input to the UL scheduler. Persona significance information includes an indication of the significance order of the active personas on the UE. In this case, the internal algorithm of the scheduler can be modified from a single-persona design to accommodate the use of personas. As a result, the prioritization will be determined at the granularity of individual bearers.

Scheduler 210, instead of only evaluating inputs 230 through 236, also weights persona significance 238, in order to determine which signal to transmit first.

Figure 3:
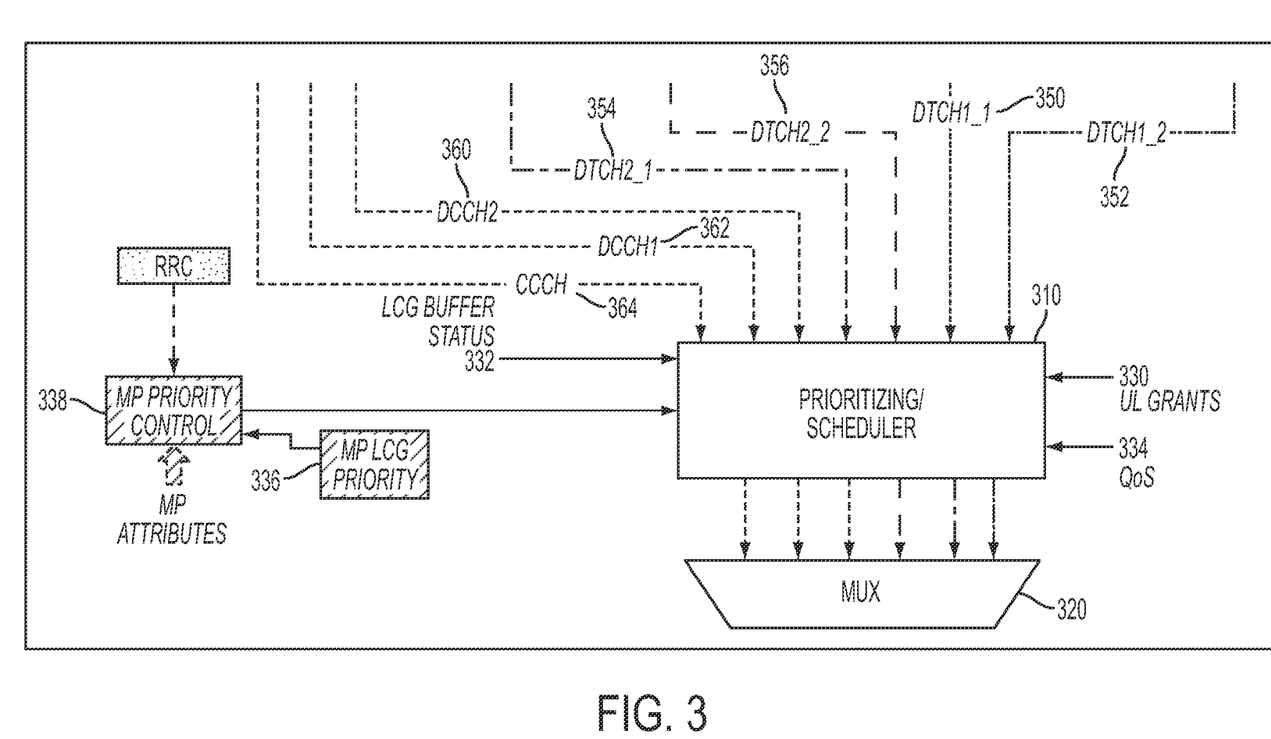
FIG. 3 is a diagram illustrating an overview of an embodiment of the present invention.

In another embodiment, in order to avoid the expense and complexities of the scheduler re-design, one of the existing inputs to the UL scheduler may be adjusted. FIG. 3 illustrates a scheduler similar to that illustrated in FIG. 2. Four data bearers 350, 352, 354, 356 (downlink traffic channels 1_1, 1_2, 2_1, and 2_2) from two personas, in addition to three signaling bearers 360, 362, 364 (2 dedicated control channel (DCCH) and common control channel (CCCH)) are incident on the HE scheduler 310 in the uplink direction.

UE scheduler 310 has several inputs including UL grants received from the eNodeB 330, the buffer status per LCG 332, and QoS requirements of the traffic bearers 334. The Logical Channel Group priorities 336 are pre-adjusted in MP Priority Control block 338. This entity is responsible for elevating the priority of the logical channel groups corresponding to the more significant persona. Another input to MP Priority Control block 338 is Radio Resource Control (RRC) 350. RRC 350 serves to handle mobility, resource allocation, session management, and the like. As a result, scheduler 310 receives an implicit indication of the significance through the modified LCG priority. Consequently, FIG. 3 has just four input signals 330, 332, 334, and 338 to the scheduler 310. In this scheme, the internal logic of scheduler 310 need not be re-designed, at the cost of less granular control of the priority only at the LCG level.

In a dual-persona case, the MP attributes input to the MP priority control can be, but are not limited to, an indication of which persona is more significant. According to the LTE specification, up to four LCGs can be formed from the logical channels (data radio bearers). In the MP case, care will be taken to form LCGs from the bearers of the same persona. In other words, there will be an MP-aware binding mechanism to bind radio bearers of the same persona to a given logical group.

In certain situations, the UL scheduler in the eNodeB also determines the Prioritized Bit Rate (PBR) of the radio bearers. In such a situation, the UL scheduler in the UE can still enforce the significance of the persona by allocating the leftover capacity of the MAC Protocol Data Unit (PDU) to the data bearers corresponding to the more significant persona. Either of the two schemes above can be used in this case too.

One benefit of the UE-only solution is that it does not involve other network nodes. To avoid potential UL/DL mismatch tier services with symmetric UL/DL traffic pattern, indirect DL flow shaping may be used the UE.

eNodeB MP-Aware Solution

Figure 4:
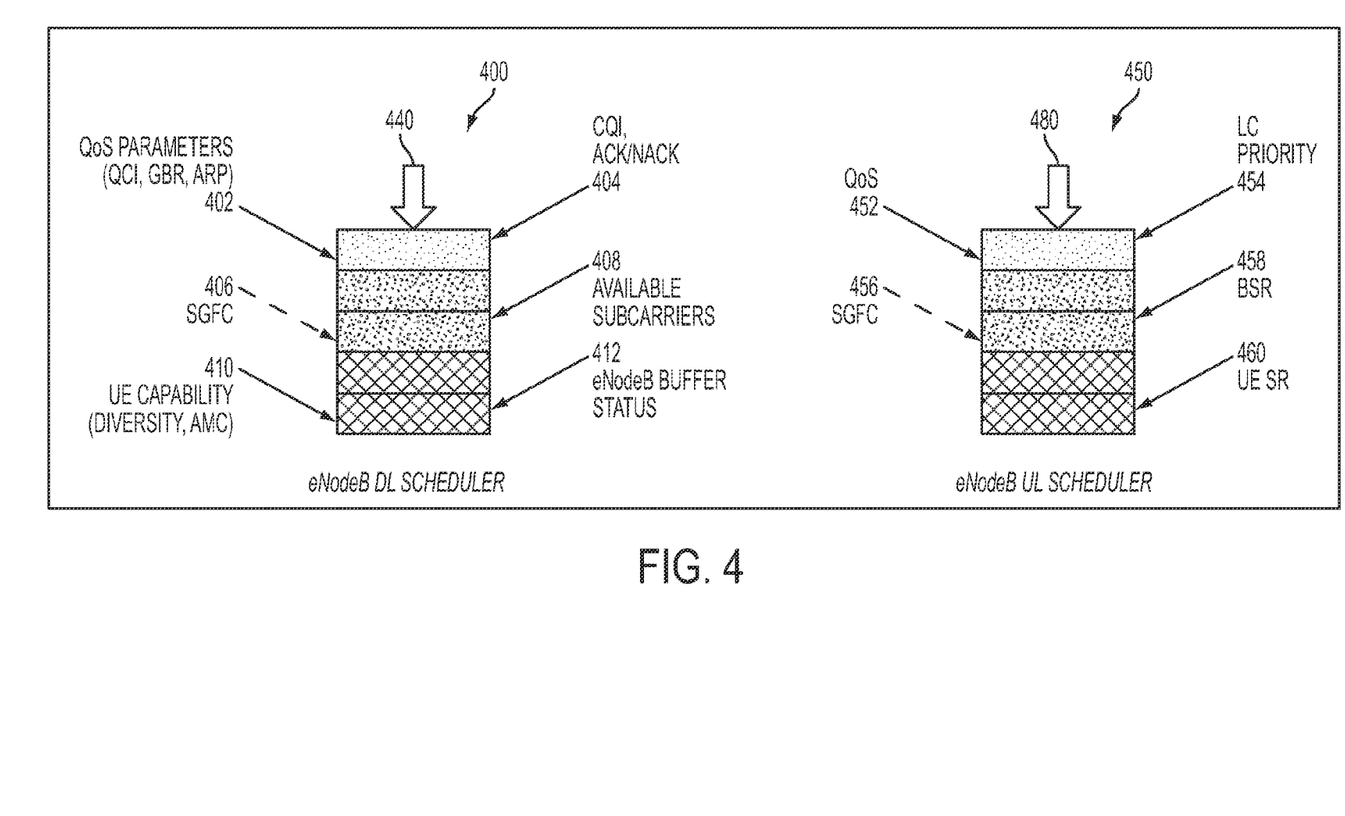
FIG. 4 is a diagram illustrating the inputs to a scheduler located in an evolved Node B.

By introducing persona knowledge in an eNodeB, traffic in both DL and UL directions can be shaped based, among other things, on persona significance. FIG. 4 shows one such embodiment. FIG. 4 illustrates a downlink scheduler 400 and an uplink scheduler 450 in an eNodeB where the DL resources are allocated among different UEs and also among bearers of the same UE. UL grants are determined for a single HE. Inputs to the DL scheduler 400 include QoS parameters 402, CQI 404, significance (SGFC) 406, available subcarriers 408, UE capability 410, and eNB buffer status 412. Another input is data stream 440, which is being prioritized in scheduler 400. Each of these inputs is evaluated to determine the transmission order of the data stream.

Inputs to UL scheduler 450 include QoS parameters 452, logical channel priority 454, SGFC 456, buffer status report (BSR) 458, LIE scheduling request (SR) 460, and data stream 480. In the MP-aware case, there will be an additional significance input indicating the significance order for those UEs with MP property. Each of these inputs is evaluated to determine the transmission order of the data stream.

Figure 5:
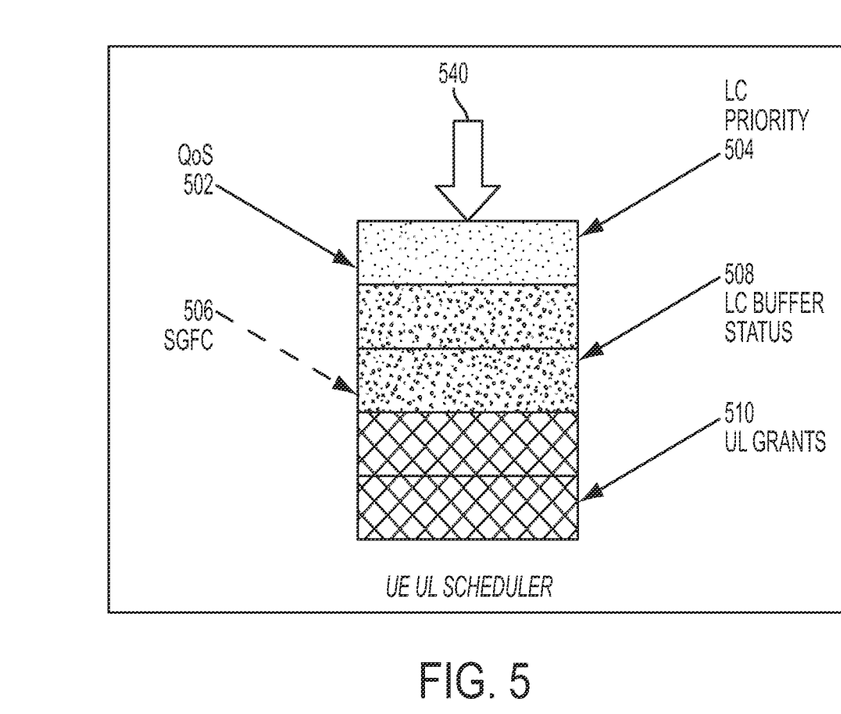
FIG. 5 is a diagram illustrating the inputs to a scheduler located in a UE.

UE scheduler 500 is illustrated in FIG. 5. UE scheduler 500 has several inputs, including QoS parameters 502, logical channel priority 504, SGFC 506, logical channel buffer status 508, and uplink grants 510. SGFC input 506 serves to enforce persona significance. The scheduler design in FIG. 5 is less complex than that of FIGS. 2 and 3 because most of the priority decisions are made in the eNodeB. Data stream 540 is being prioritized in scheduler 500.

The SGFC parameter still needs to be conveyed to the network and to the eNodeB. In one embodiment, this can be done by adding an SGFC field to the QoS structure for the activated bearer. During the signaling procedure to create/modify bearers, the EPS-subscribed QoS profile, retrieved from the Home Subscriber Server (HSS) node has the following components:

EPS_subscribed_QoS Profile: [ARP, QCI, SGFC]

An embodiment with eNodeB awareness produces a comprehensive solution to the MP problem, but at the cost of extending the MP concept to other LTE network nodes.

Multiple-Persona GBR Services

In the MP context, when services require guaranteed bit rates, the persona significance needs to be propagated into the Allocation and Retention Priority (ARP) parameter. According to current LTE specifications, an EPS Subscribed QoS Profile is set individually for each Access Point Name (APN). IP connectivity of the MP LIE terminates in separate packet domains based on the requirement of enabling connectivity control for each per persona. Hence, each persona of a device has a different APN. The APR parameter in the QoS profile of the APN can be configured based on the significance of the persona in such a way that GBR services of the more significant persona will assume a tower ARP value. In addition, their pre-emption capability/vulnerability flags can be set accordingly so eNodeB admission control prioritizes these services during congestion. Also, the handling of different bearers during exceptional resource limitations can be adjusted taking the MP concept into account. For example, bearers that are assigned to a persona with low significance can be dropped first at handover (if needed). It is to be noted that this solution does not need the eNodeB to be MP-aware as it only depends on programming MP-related QoS profiles into the HSS database per APN.

Aligning Persona Significance and QoS QCI

Figure 6:
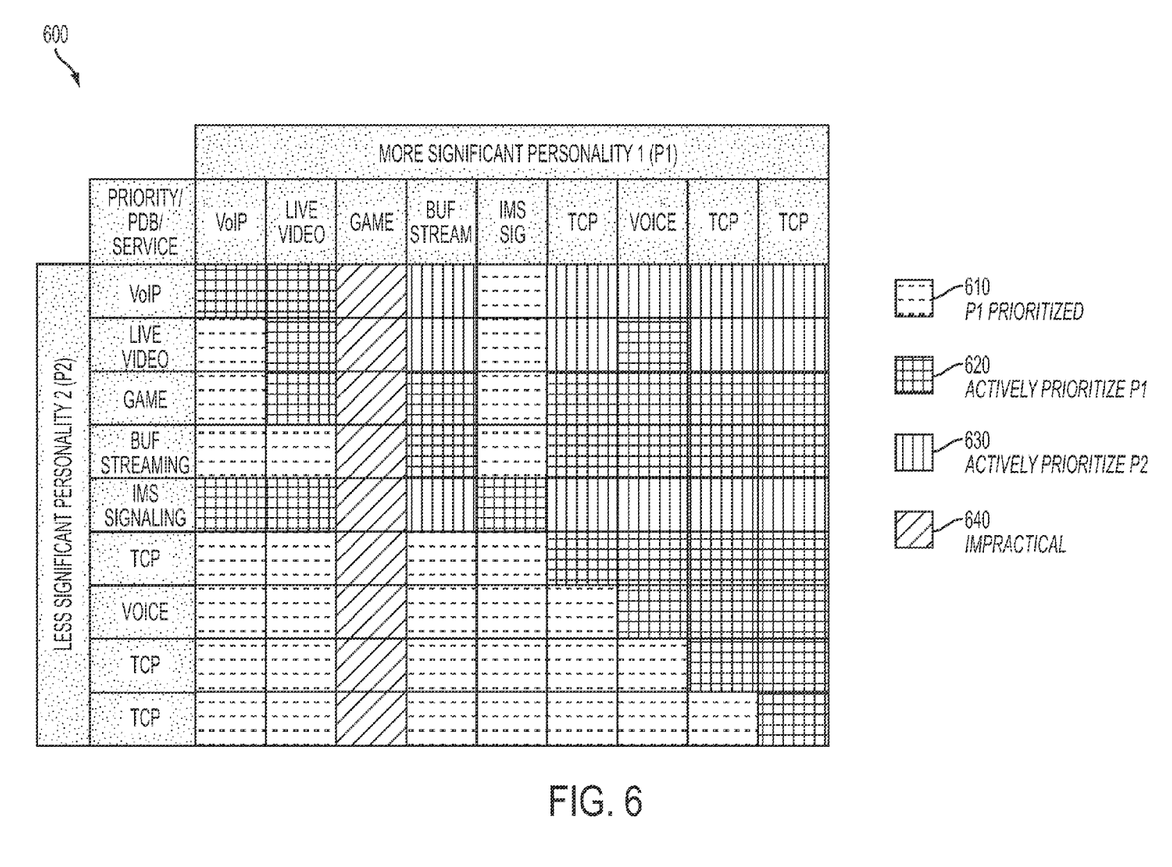
FIG. 6 is a matrix illustrating an exemplary prioritization scheme.

The examples discussed above highlight a scenario of IMS signaling on one persona and buffered streaming applications on another, where QoS QCI priority is not aligned with the significance of the persona generating the traffic. FIG. 6 presents an exemplary matrix that illustrates how a persona can be prioritized in an exemplary embodiment. It should be understood that other matrices are possible where different applications may have different priority over other applications.

While it is possible to have a simpler system that merely prioritizes applications running on the more significant personality, the persona/QoS matrix 600 of FIG. 6 shows one possible approach to resolving significance/QCI conflict in a more flexible manner. Areas 610 correspond to use cases where the more significant persona (P1) is running an application that already has priority over the application being executed by P2. In these situations, no action needs to be taken.

Areas 620 are those where QCI rules would have the application being executed by P2 prioritized over the application being executed by P1—in the absence of persona rules, the P2 application would have priority over the application run by P1. This is not desirable. So in these situations, the persona significance overrules the QCI rules and the application that would normally have less precedence is actively prioritized over the other application, using the methods described above.

In area 630, the application being executed by P2 is prioritized over the application being executed by P1, even though it has a lower significance. There may be several reasons to prioritize a P2 application over a P1t application. For example, a stringent delay requirement of a P2 application may require that the P2 application be prioritized over P1. It should be understood that there may be other reasons why a P2 application is prioritized over a P1 application. This application is not intended to be limited by any such prioritization. In FIG. 6, these situations may include situations when P2 is operating an IMS signaling application, live video, or a VoIP application (applications with a QoS priority level of 1, 2, or 4). In this embodiment, games, with a QoS priority level of 3, are never prioritized over P1 applications, even if the game application would normally be prioritized over the application running in P1. In this embodiment, the setting was purposely made in this manner to discourage users from using game applications. This is further shown in area 640, which represents prioritizations that impractical. In this example, persona 1 never allows games to run on its network. Therefore, all the matrix entries involving a game application running on P1 are shown as not allowed.

It should be noted that what is presented in FIG. 6 is based on an exemplary scheme of setting priority among applications of two personalities. The flexibility of an embodiment of this invention is that different network operators can provide different matrices 600. For example, another corporate provider may not have a policy of banning games running on P1, and merely give it a very low priority instead of banning games altogether. Even though the same logic can be applied for cases when the personalities spawn more than one application/service, or more than two personalities are involved, priority resolution scheme becomes multi-dimensional and more complex to formulate. It should also be noted that, although the examples presented here discuss two personas, the schemes and methods and systems presented herein may be extended to three or more personas.

The following examples pertain to further embodiments.

A method of scheduling uplink transmissions in a wireless communications system may comprise: receiving a first signal from a first data bearer, the first signal originating from a first persona; receiving a second signal from a second data bearer, the second signal originating from a second persona; receiving persona significance information regarding the first and second data bearers; and using the persona significance information to determine the priority between the first data bearer and the second data bearer. The persona significance information comprises an indication of the significance order of the first persona and the second persona.

If the persona significance information indicates that the first persona has higher significance than the second persona, then the first signal from the first data bearer may be prioritized. If the persona significance information indicates that the second persona has higher significance than the first persona, then the second signal from the second data bearer may be prioritized. The method may be performed by an evolved Node B or by user equipment (UE).

In another embodiment, the method may further comprise: receiving first inputs regarding uplink grants; receiving second inputs regarding a buffer status; receiving third inputs regarding QoS requirements; and receiving fourth inputs regarding logical channel group priority. The step of using the persona significance information further comprises using the first, second, third, and fourth inputs in conjunction with said persona significance information to determine the priority between the first data bearer and the second data bearer.

In another embodiment, the method may further comprise: receiving first inputs regarding uplink grants; receiving second inputs regarding a buffer status; receiving third inputs regarding QoS requirements; and receiving fourth inputs regarding logical channel group priority. The inputs regarding logical group priority may be combined with the persona significance information before the step of using the persona significance information.

In another embodiment, the third inputs regarding QoS requirements include QoS priority level information and the step of using the persona significance information comprises: evaluating the persona significance information; and evaluating QoS priority level information. The priority is granted to a data bearer based on said persona significance information and said QoS priority level information.

In one embodiment, the priority is granted to the data bearer with the higher persona significance information. In another embodiment, the priority is granted to the data bearer with the higher persona significance information unless the data bearer with the lower persona significance information has a QoS priority level of 1, 2, or 4.

The wireless communications system may be a Long Term Evolution (LTE) system,

In another embodiment, a user equipment (UE) for operating in a multiple persona environment may comprise: a scheduler comprising a receiver arranged to receive a signal from a first data bearer, receive a signal from a second data bearer, and receive persona significance information regarding the first and second data bearers. The user equipment may further comprise a processor arranged to use the persona significance information to determine the priority between the first data bearer and the second data bearer.

In another embodiment, the scheduler is further arranged to: receive first inputs regarding uplink grants; receive second inputs regarding a buffer status; receive third inputs regarding QoS requirements; and receive fourth inputs regarding logical channel group priority. The processor may be arranged to use said first, second, third, and fourth inputs in conjunction with said persona significance information to determine the priority between the first data bearer and the second data bearer.

In another embodiment, the third inputs regarding QoS requirements include QoS priority level information; and the processor is further arranged to: evaluate the persona significance information; evaluate QoS priority level information; and grant priority to a data bearer based on said persona significance information and said QoS priority level information.

In another embodiment, the processor is further arranged to grant priority to the data bearer with the higher persona significance information.

In another embodiment, the processor is further arranged to grant priority to the data bearer with the higher persona significance information unless the data bearer with the lower persona significance information has a QoS priority level of 1, 2, or 4.

In another embodiment, an evolved node B may comprise: a scheduler which comprises: a receiver arranged to receive a signal from a first data bearer, receive a signal from a second data bearer, and receive persona significance information regarding the first and second data bearers; a processor arranged to use the persona significance information to determine the priority between the first data bearer and the second data bearer.

In another embodiment, the scheduler is further arranged to: receive first inputs regarding uplink grants; receive second inputs regarding a buffer status; receive third inputs regarding QoS requirements; and receive fourth inputs regarding logical channel group priority; and wherein said processor is arranged to use said first, second, third, and fourth inputs in conjunction with said persona significance information to determine the priority between the first data bearer and the second data bearer.

In another embodiment, the third inputs regarding QoS requirements include QoS priority level information; and the processor is further arranged to: evaluate the persona significance information; evaluate QoS priority level information; and grant priority to a data bearer based on said persona significance information and said QoS priority level information.

In another embodiment, the processor may be further arranged to grant priority to the data bearer with the higher persona significance information. In another embodiment, the processor is further arranged to grant priority to the data bearer with the higher persona significance information unless the data bearer with the lower persona significance information has a QpS priority level of 1, 2, or 4.

Although embodiments of the invention are not limited in this regard, the terms "plurality" and "a plurality" as used herein may include, thr example, "multiple" or "two or more." The terms "plurality" or "a plurality" may be used throughout the specification to describe two or more components, devices, elements, units, parameters, and the like. For example, "a plurality of stations" may include two or more stations.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of scheduling uplink transmissions in a wireless communications system comprising:
   receiving a first signal from a first data bearer, the first signal originating from a first persona for connecting with a first network;
   receiving a second signal from a second data bearer, the second signal originating from a second persona for connecting with a second network different from the first network;
   receiving first inputs regarding uplink grants;
   receiving second inputs regarding a buffer status;
   receiving third inputs regarding QoS requirements, wherein the third inputs include QoS priority level information;
   receiving fourth inputs regarding logical channel group priority;
   receiving persona significance information regarding the first and second data bearers;
   using the first inputs, the second inputs, the third inputs, and the fourth inputs in conjunction with the persona significance information to determine the priority between the first data bearer and the second data bearer and to grant priority to a data bearer with the higher persona significance information unless the data bearer with the lower persona significance information has a QoS priority level and packet delay budget (PDB) such that the lower persona significance information has a more stringent delay requirement than the higher persona significance information; wherein
   the persona significance information comprises an indication of the significance order of the first persona and the second persona.

2. The method of claim 1 wherein:
   if the persona significance information indicates that the first persona has higher significance than the second persona, then prioritizing the first signal from the first data bearer; and
   if the persona significance information indicates that the second persona has higher significance than the first persona, then prioritizing the second signal from the second data bearer.

3. The method of claim 1 wherein:
   said method is performed by a piece of user equipment (UE).

4. The method of claim 1 wherein said step of granting priority further comprises:
   granting priority to the data bearer with the higher persona significance information unless the data bearer with the lower persona significance information has a QoS priority level of 1, 2, or 4.

5. The method of claim 1 wherein said method is performed by an evolved node B (eNB).

6. The method of claim 1 wherein said wireless communications system is a Long Term Evolution (LTE) system.

7. A user equipment (UE) for operating in a multiple persona environment comprising:
   a scheduler comprising:
   a receiver arranged to receive a signal from a first data bearer originating from a first persona for connecting with a first network, receive a signal from a second data bearer originating from a second personal for connecting with a second network different from the first network, receive first inputs regarding uplink grants, receive second inputs regarding a buffer status receive third inputs regarding QoS requirements, wherein the third inputs include QoS priority level information, receive fourth inputs regarding logical channel group priority, and receive persona significance information regarding the first and second data bearers;

a processor arranged to use the first inputs, the second inputs, the third inputs, and the fourth inputs in conjunction with the persona significance information to determine the priority between the first data bearer and the second data bearer and to grant priority to a data bearer with the higher persona significance information unless the data bearer with the lower persona significance information has a QoS priority level and packet delay budget (PDB) such that the lower persona significance information has a more stringent delay requirement than the higher persona significance information.

8. The user equipment of claim 7 wherein the processor is further arranged to grant priority to the data bearer with the higher persona significance information unless the data bearer with the lower persona significance information has a QoS priority level of 1, 2, or 4.

9. An evolved node B comprising:
   a scheduler comprising:
      a receiver arranged to receive a signal from a first data bearer originating from a first persona for connecting with a first network, receive a signal from a second data bearer originating from a second personal for connecting with a second network different from the first network, receive first inputs regarding uplink grants, receive second inputs regarding a buffer status, receive third inputs regarding QoS requirements, wherein the third inputs include QoS priority level information, receive fourth inputs regarding logical channel group priority, and receive persona significance information regarding the first and second data bearers;
      a processor arranged to use the first inputs, the second inputs, the third inputs, and the fourth inputs in conjunction with the persona significance information to determine the priority between the first data bearer and the second data bearer and to grant priority to a data bearer with the higher persona significance information unless the data bearer with the lower persona significance information has a QoS priority level and packet delay budget (PDB) such that the lower persona significance information has a more stringent delay requirement than the higher persona significance information.

10. The evolved node B of claim 9 wherein the processor is further arranged to grant priority to the data bearer with the higher persona significance information unless the data bearer with the lower persona significance information has a QoS priority level of 1, 2, or 4.

* * * * *

UNITED STATES PATENT AND TRADEMARK OFFICE
CERTIFICATE OF CORRECTION

PATENT NO. : 8,989,207 B2  
APPLICATION NO. : 13/629550  
DATED : March 24, 2015  
INVENTOR(S) : Sajadieh et al.

Page 1 of 1

It is certified that error appears in the above-identified patent and that said Letters Patent is hereby corrected as shown below:

On the title page, item 57, in "Abstract", in column 2, line 12, delete "anew" and insert --a new--, therefor.

In the claims

In column 10, line 62, in Claim 7, delete "status" and insert --status,--, therefor.

Signed and Sealed this
Fourteenth Day of June, 2016

Michelle K. Lee
*Director of the United States Patent and Trademark Office*